US011929702B2

(12) United States Patent
Kang et al.

(10) Patent No.: US 11,929,702 B2
(45) Date of Patent: Mar. 12, 2024

(54) POWER APPARATUS FOR VEHICLE

(71) Applicant: HYUNDAI MOBIS Co., Ltd., Seoul (KR)

(72) Inventors: Tae Hwan Kang, Incheon (KR); Keon Lee, Namyangju-si (KR); Beom Cheol Cho, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/549,012

(22) Filed: Dec. 13, 2021

(65) Prior Publication Data
US 2022/0190759 A1 Jun. 16, 2022

(30) Foreign Application Priority Data

Dec. 15, 2020 (KR) .......................... 10-2020-0175297

(51) Int. Cl.
H02P 9/00 (2006.01)
H02P 9/30 (2006.01)
B60R 16/033 (2006.01)

(52) U.S. Cl.
CPC ............ H02P 9/305 (2013.01); B60R 16/033 (2013.01)

(58) Field of Classification Search
CPC ......... H02P 9/305; H02M 1/36; H02M 3/156; H02M 3/157; B60R 16/033; B60R 16/023; B60R 16/005
See application file for complete search history.

(56) References Cited

U.S. PATENT DOCUMENTS 6,541,943 B1 * 4/2003 Wylie ...................... H02P 9/48
322/17
2009/0144571 A1 * 6/2009 Tatsumi ................ G06F 1/3287
713/320
2022/0102769 A1 * 3/2022 Shidore ............... H02J 7/00712

FOREIGN PATENT DOCUMENTS

KR 10-2010-0028942 A 3/2010
KR 10-2013-0033189 A 4/2013

OTHER PUBLICATIONS

Korean Office Action dated Jun. 22, 2022, issued in corresponding Korean Patent Application No. 10-2020-0175297.

* cited by examiner

Primary Examiner — Julio C. Gonzalez
(74) Attorney, Agent, or Firm — MORGAN, LEWIS & BOCKIUS LLP

(57) ABSTRACT

A power apparatus for a vehicle manages power for a vehicle by performing a power-up operation according to a power-up method determined on the basis of a voltage formed at a power input node connected to a battery of the vehicle when a power-up signal is applied. The power apparatus including a regulator configured to regulate a battery voltage inputted through the power input node; a switch driving circuit configured to turn on/off a switch that controls a connection between the battery and the regulator through the power input node; and a main logic circuit configured to receive control authority for the switch driving circuit from the power apparatus when receiving the power-up signal and the operating voltage generated by the regulator, and to control an on/off operation of the switch.

4 Claims, 7 Drawing Sheets

POWER APPARATUS FOR VEHICLE

CROSS-REFERENCE TO RELATED APPLICATION

This application claims priority from and the benefit of Korean Patent Application No. 10-2020-0175297, filed on Dec. 15, 2020, which is hereby incorporated by reference for all purposes as if set forth herein.

BACKGROUND

Field

Exemplary embodiments of the present disclosure relate to a power apparatus for a vehicle, and more particularly, to a power apparatus for a vehicle, which substantially prevents a power-up operation from failing.

Discussion of the Background

A power management integrated circuit (PMIC) is a semiconductor chip for managing power requirements of a system and is applied to various host systems in order to perform power conversion and power control functions. The power management IC applied to a vehicle performs a function of managing the overall power of the vehicle by performing a power-up operation on the basis of power inputted from a battery when a wake-up signal or a key-on signal (hereinafter, referred to a power-up signal) of the vehicle is applied.

A power-up method of the power management IC (hereinafter, referred to an IC chip) applied to a vehicle is classified into a permanent battery method and a non-permanent battery method depending on a method of receiving power from a battery. When a power-up signal is applied, the IC chip compares a voltage of a node connected to the battery with a threshold (predefined as a value lower than the battery voltage), determines whether the power-up method is the permanent battery method or the non-permanent battery method, and performs a power-up operation according to the determination result.

As illustrated in FIG. 1(a), the permanent battery method refers to a method in which a battery voltage VB is always supplied to the IC chip. When a power-up signal Power_up sig is applied, the IC chip checks a voltage of a node VB_IN and recognizes the power-up method as the permanent battery method because the voltage of the node VB_IN is the battery voltage VB and is greater than the threshold. After several µs, a V3V3 regulator is turned on and an operating voltage V3V3 is supplied to a main logic module Main Logic, so that the power-up of the IC chip is performed.

As illustrated in FIG. 1(b), the non-permanent battery method refers to a method in which when the power-up signal Power_up sig is applied in a state in which the supply of the battery voltage VB is cut off (reset state) because a main relay (MR) is opened, the main relay (MR) is shorted and the battery voltage VB is supplied to the IC chip. When the power-up signal Power_up sig is applied, the IC chip checks the voltage of the node VB_IN and recognizes the power-up method as the non-permanent battery method because the voltage of the node VB_IN is smaller than the threshold. The IC chip turns on a main relay driver (MRD), and accordingly, the main relay is turned on after about 100 µs by induced electromotive force and the battery voltage VB is supplied to the IC chip. Then, the V3V3 regulator is turned on, the operating voltage V3V3 is supplied to the main logic module Main Logic, and the main logic module Main Logic controls the main relay driver (MRD) so that the turn-on state of the main relay (MR) is substantially maintained, which makes it possible to perform the power-up of the IC chip.

The aforementioned related art is technology information possessed by the inventor for the derivation of the present disclosure or acquired in the derivation process of the present disclosure, and is not necessarily a publicly known technology disclosed to the general public before the application of the present disclosure.

SUMMARY

Among the power-up methods of the IC chip, the non-permanent battery method has a problem in that power-up may fail in the process of performing continuous power-up operations. specifically, in a state in which the IC chip is powered up and then the power-up signal is disabled to power off the IC chip, when the power-up signal is enabled again and the power-up operation needs to be performed, power-up may fail depending on a voltage formed in the node VB_IN at a time point at which the power-up signal is enabled.

Referring to FIG. 2(a), as the main relay MR is opened at a time point 'A' at which the power-up signal Power_up sig is disabled, the voltage of the node VB_IN starts to decrease. Since the voltage of the node VB_IN is less than a threshold VB_TH at a time point 'B' at which the power-up signal is enabled again, the IC chip recognizes the power-up method as the non-permanent battery method. Thus, the main relay driver (MRD) is controlled by the main logic module, so that the power-up of the IC chip is normally performed.

On the other hand, referring to FIG. 2(b), since the voltage of the node VB_IN is equal to or greater than the threshold VB_TH at the time point 'B' at which the power-up signal Power_up sig is enabled again, the IC chip recognizes the power-up method as the permanent battery method, and thus the main relay driver (MRD) is not controlled by the main logic module. Thus, the main relay MR substantially maintains an off state, so that the power-up of the IC chip fails.

The present disclosure has been made to solve the above problems, and an object according to one aspect of the present disclosure is to provide a power apparatus for a vehicle, which enables power-up of an IC chip adopting a non-permanent battery method to be normally performed without a power-up failure even when a plurality of power-up operations are continuously performed in the IC chip.

A power apparatus for a vehicle in accordance with one aspect of the present disclosure is a power apparatus for a vehicle, which manages power for a vehicle by performing a power-up operation according to a power-up method determined on the basis of a voltage formed at a power input node connected to a battery of the vehicle when a power-up signal is applied, and includes: a regulator configured to regulate a battery voltage inputted through the power input node; a switch driving circuit configured to turn on/off a switch that controls a connection between the battery and the regulator through the power input node, an operation of the switch driving circuit being controlled by the power apparatus when a power-up signal is initially applied; and a main logic circuit configured to receive control authority for the switch driving circuit from the power apparatus when receiving the power-up signal and the operating voltage generated by the regulator, and to control an on/off operation of the switch by controlling the switch driving circuit, wherein the power apparatus determines a power-up method on the basis of the input voltage when the power-up signal is initially applied, and allows a subsequent power-up operation to be performed according to the determined power-up method.

In the present disclosure, when the input voltage when the power-up signal is initially applied is less than a predefined threshold, the power apparatus may determine that a power-up method of the power apparatus is a first power-up method, and when the input voltage when the power-up signal is initially applied is equal to or greater than the threshold, the power apparatus may determine that the power-up method of the power apparatus is a second power-up method, and the first and second power-up methods may be opposite methods with respect to whether the switch driving circuit is controlled.

In the present disclosure, when it is determined that the power-up method is the first power-up method, the power apparatus may turn on the switch by initially controlling the switch driving circuit, and the main logic circuit may receive the operating voltage from the regulator, receive the control authority for the switch driving circuit from the power apparatus, and control the switch driving circuit so that an on state of the switch is substantially is maintained, thereby allowing the power apparatus to be powered up according to the first power-up method.

The power apparatus may further include a register unit, and wherein when it is determined that the power-up method is the first power-up method as a case where the power-up signal is initially applied, the power apparatus may store a first identification parameter indicating the first power-up method in the register unit, and allow a subsequent power-up operation to be performed according to the first power-up method by referring to the first identification parameter stored in the register unit, during the subsequent power-up operation.

In the present disclosure, when a secondary power-up operation is performed as a power-up signal is applied in a power-off state after a primary power-up operation, even though the input voltage when the power-up signal is applied is equal to or greater than the threshold, the power apparatus may allow the secondary power-up operation to be performed according to the first power-up method by preferentially referring to the first identification parameter stored in the register unit.

In the present disclosure, the primary power-up operation, the power-off operation, and the secondary power-up operation of the power apparatus may be continuously performed within a predefined time period.

The power apparatus may further include a mux circuit, and is when it is determined that the power-up method is the second power-up method as a case where the power-up signal is initially applied, the power apparatus may store a second identification parameter indicating the second power-up method in the register unit, and the mux circuit may be configured to receive the identification parameters stored in the register unit, to permit the control authority of the main logic circuit for the switch driving circuit when receiving the first identification parameter, and to limit the control authority of the main logic circuit for the switch driving circuit when receiving the second identification parameter.

In accordance with one aspect of the present disclosure, when a power-up signal is initially applied to an IC chip, a power-up method of the IC chip may be determined on the basis of a voltage in a node connected to a battery and may be stored in a register and power-up may be performed according to information stored in the register during a subsequent power-up operation, thereby removing erroneous determination on a power-up method currently applied the IC chip and allowing power-up of the IC chip to be normally performed without a power-up failure.

DETAILED DESCRIPTION OF THE ILLUSTRATED EMBODIMENTS

Figure 1A:
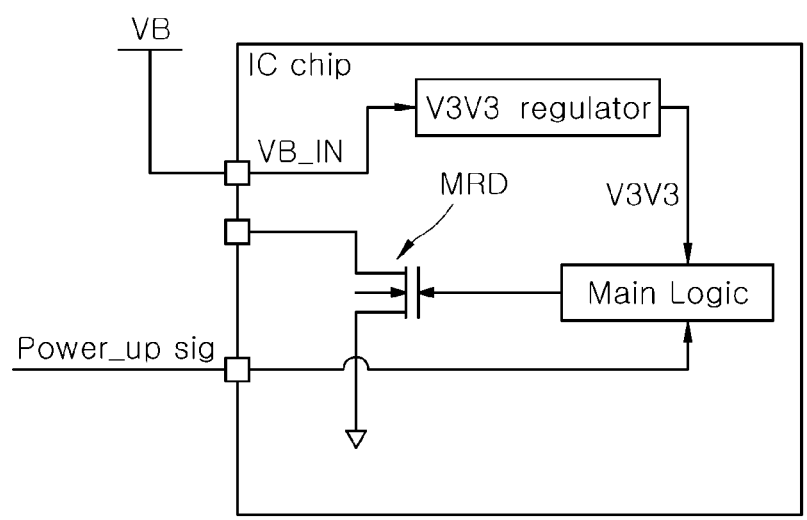
FIGS. 1A and 1B and FIGS. 2A and 2B are exemplary diagrams for explaining problems to be solved by a power apparatus for a vehicle in accordance with an embodiment of the present disclosure.
Figure 1B:
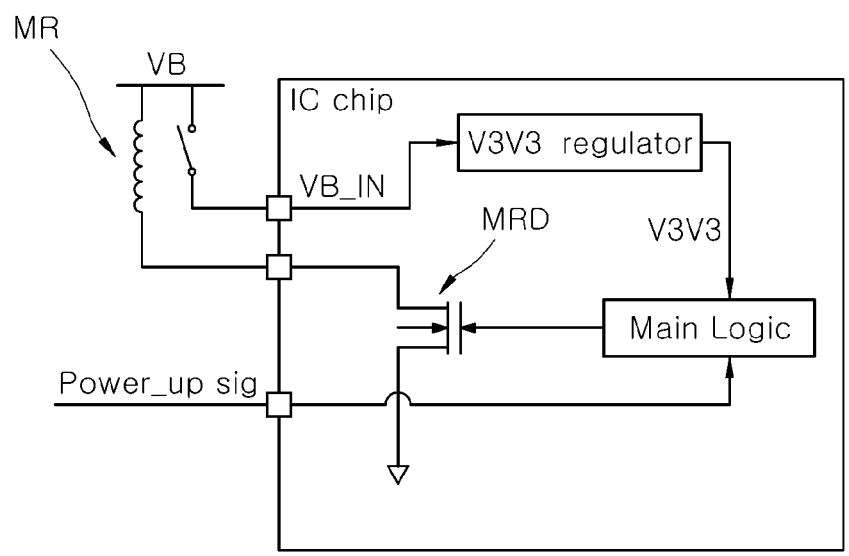
Figure 2A:
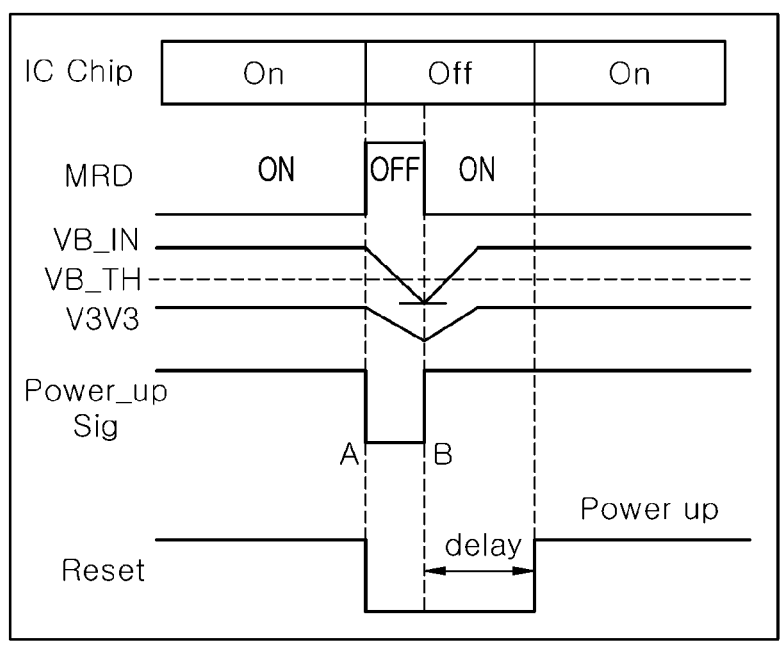
Figure 2B:
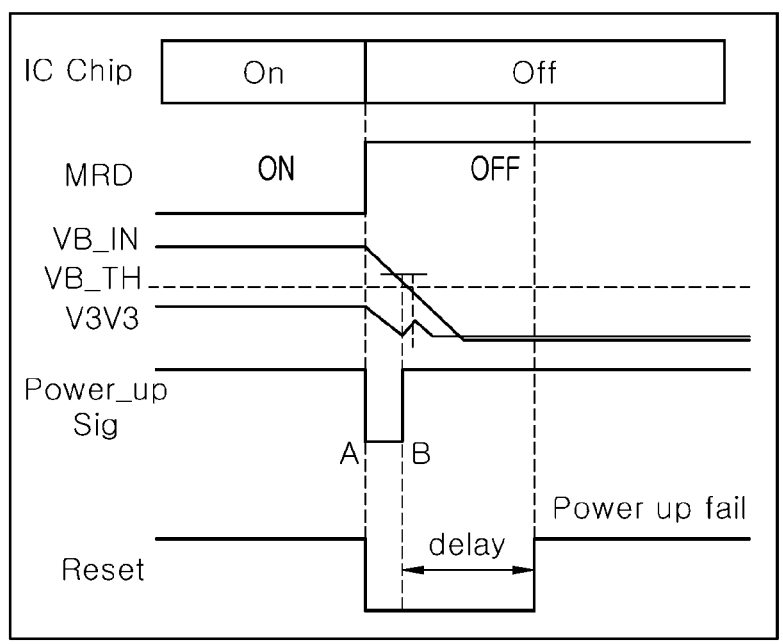

Hereinafter, a power apparatus for a vehicle in accordance with an embodiment of the present disclosure will be described below with reference to the accompanying drawings. In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined on the basis of the disclosure over the present specification.

Figure 3:
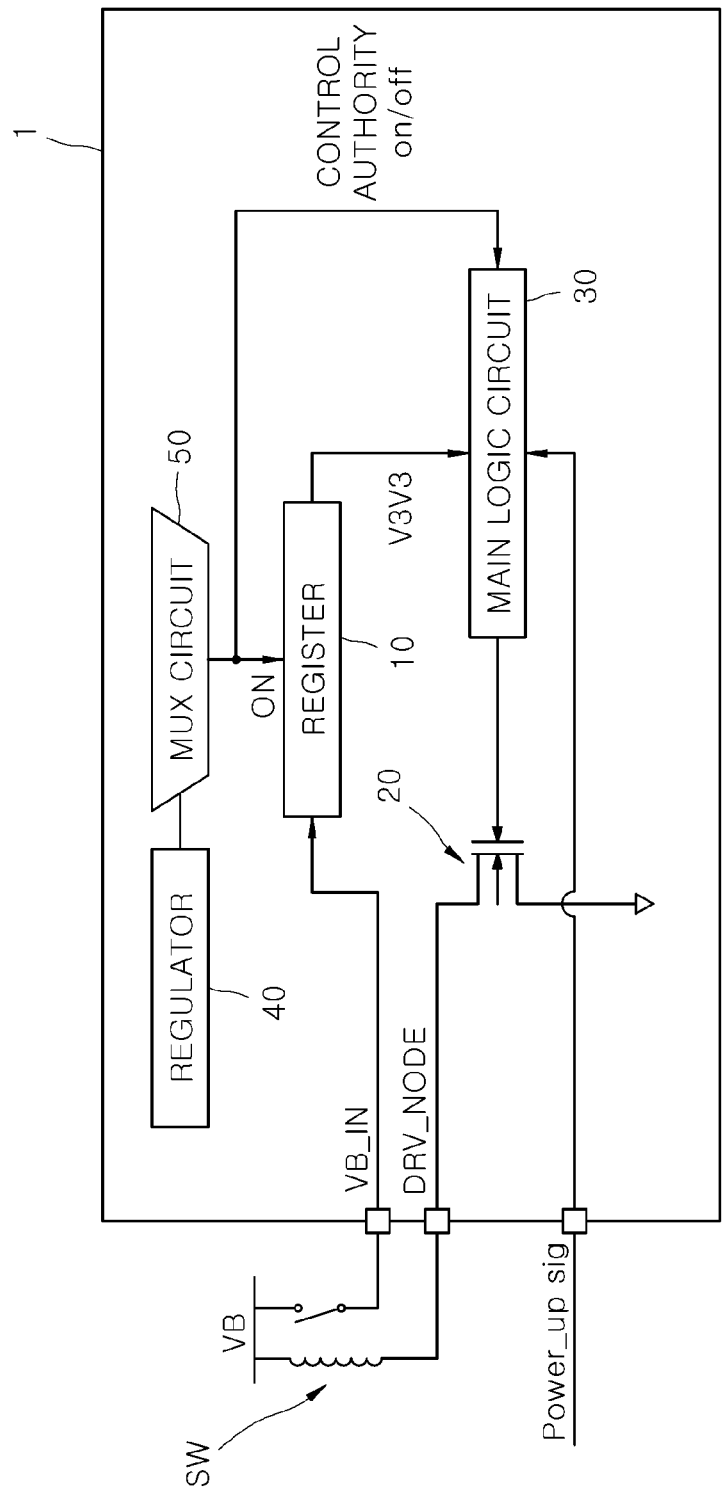
FIG. 3 is a block diagram for explaining the power apparatus for a vehicle in accordance with the embodiment of the present disclosure.

FIG. 3 is a block diagram for explaining a power apparatus for a vehicle in accordance with an embodiment of the present disclosure, and FIG. 4 is an exemplary diagram for explaining a process in which power-up is normally performed through the power apparatus for a vehicle in accordance with the embodiment of the present disclosure.

A power apparatus 1 for a vehicle in accordance with the present embodiment may be implemented as a semiconductor chip (for example, a power management IC) that manages power for the vehicle by performing a power-up operation according to a power-up method determined on the basis of a voltage formed at a node connected to a battery of the vehicle when a power-up signal (for example, a wake-up signal or a key-on signal) is applied. As illustrated in FIG. 3, the present embodiment is premised on the assumption that a power apparatus adopts a non-permanent battery method. Thus a switch SW may be connected between the power apparatus 1 and a battery (however, its application may be extended to a permanent battery method by a mux circuit 50 as will be described below). The switch SW may be implemented as a main relay, and for convenience of the following description, a node at which a switch contact point of the main relay is connected to the power apparatus 1 will be defined as a 'power input node' VB_IN, a node to which an inductor of the main relay is connected will be defined as a 'driving node' DRV_NODE, and a voltage formed at the power input node will be referred to as an 'input voltage'.

The power apparatus 1 for a vehicle in accordance with the present embodiment may include a regulator 10, a switch driving circuit 20, a main logic circuit 30, a register unit 40, and the mux circuit 50 as illustrated in FIG. 3.

The regulator 10 may operate as a regulator that generates an operating voltage V3V3 for an operation of the main logic circuit 30 to be described below by regulating a battery voltage inputted through the aforementioned power input node.

The switch driving circuit 20 may operate to turn on/off a switch SW that controls a connection between the battery and the regulator 10 through the power input node. As illustrated in FIG. 3, the switch driving circuit 20 may correspond to a main relay driver (MRD) implemented as an FET. When the switch driving circuit 20 is turned on, an inductor of the switch SW is excited, and a switching contact point is shorted to connect the battery and the regulator 10 through the power input node, so that a battery voltage may be supplied to the regulator 10. When the switch driving circuit 20 is turned off, the switching contact point is opened, so that the battery and the regulator 10 through the power input node may be disconnected from each other. The aforementioned control for the switch driving circuit 20 is initially performed at the level of the power apparatus 1 (that is, an IC chip) of the present embodiment, and the control authority is then transferred to the main logic circuit 30 to be described below.

The main logic circuit 30 may operate as a switch controller that receives the control authority for the switch driving circuit 20 from the power apparatus 1 when receiving the power-up signal and the operating voltage generated by the regulator 10, and controls an on/off operation of the switch SW by controlling the switch driving circuit 20.

The register unit 40 is implemented as a flip-flop and is configured to store an identification parameter indicating a power-up method as described below. The mux circuit 50 is configured to receive the identification parameter stored in the register unit 40 and to permit or limit the control authority of the main logic circuit 30 for the switch driving circuit 20. Details thereof will be described below.

The power apparatus 1 of the present embodiment including the above sub-configuration may determine a power-up method on the basis of an input voltage when the power-up signal is initially applied, and allow a subsequent power-up operation to be performed according to the determined power-up method. The power-up method in which the power apparatus 1 is powered up may be classified into first and second power-up methods corresponding to mutually opposite methods with respect to whether the switch driving circuit 20 is controlled. The first power-up method may correspond to the non-permanent battery method in which the main logic circuit 30 may have the control authority for the switch driving circuit 20 and control the switch driving circuit 20. The second power-up method may correspond to the permanent battery method in which the switch driving circuit 20 is not controlled. In such a case, at a time point at which the power-up signal is initially applied, both when the input voltage of the power input node is less than a predefined threshold (predefined as a value lower than the battery voltage), the power apparatus 1 determines that the power-up method is the first power-up method, and when the input voltage is equal to or greater than the threshold, the power apparatus 1 determines that the power-up method is the second power-up method, and stores, in the register unit 40, a first identification parameter (for example, may have a value of '0' as a binary code) indicating the first power-up method or a second identification parameter (for example, may have a value of '1' as a binary code) indicating the second power-up method according to the determination result. The identification parameters stored in the register unit 40 serve as reference factors in determining a subsequent power-up method.

Based on the foregoing, a topology will be described below in detail, which is adopted in the present embodiment in order to substantially prevent a power-up failure when continuous power-up operations of the power apparatus 1 are performed.

When it is determined that the power-up method is the first power-up method because the input voltage of the power input node is less than the threshold at the time point at which the power-up signal is initially applied to the power apparatus 1, the power apparatus 1 first operates to turn on the switch SW by initially controlling the switch driving circuit 20 at the power apparatus level (that is, the IC chip level) (that is, turning on the switch driving circuit 20). At the same time, the power apparatus 1 stores the first identification parameter indicating the first power-up method in the register unit 40.

Then, the regulator 10 generates an operating voltage of the main logic circuit 30 by regulating a battery voltage supplied according to the on operation of the switch SW. The main logic circuit 30 receives the operating voltage from the regulator 10, receives the control authority for the switch driving circuit 20 from the power apparatus 1, and controls the switch driving circuit 20 so that the on state of the switch SW is substantially maintained. Accordingly, the on state of the switch SW is substantially maintained through the control of the switch driving circuit 20 by the main logic circuit 30, so that the power apparatus 1 is powered up according to the first power-up method.

When the power-up operation is performed according to the first power-up method and a subsequent power-up operation is performed after a power-off operation is performed, the power apparatus 1 may allow the subsequent power-up operation to be performed according to the first power-up method by referring to the first identification parameter stored in the register unit 40. Specifically, in a case where a secondary power-up operation is performed as the power-up signal is applied in the power-off state after a primary power-up operation, even when the input voltage of the power input node when the power-up signal is applied is equal to or greater than the threshold (that is, even when it is determined that the power-up method corresponds to the second power-up method), the power apparatus 1 may allow the secondary power-up operation to be performed according to the first power-up method by preferentially referring to the first identification parameter stored in the register unit 40.

Figure 4A:
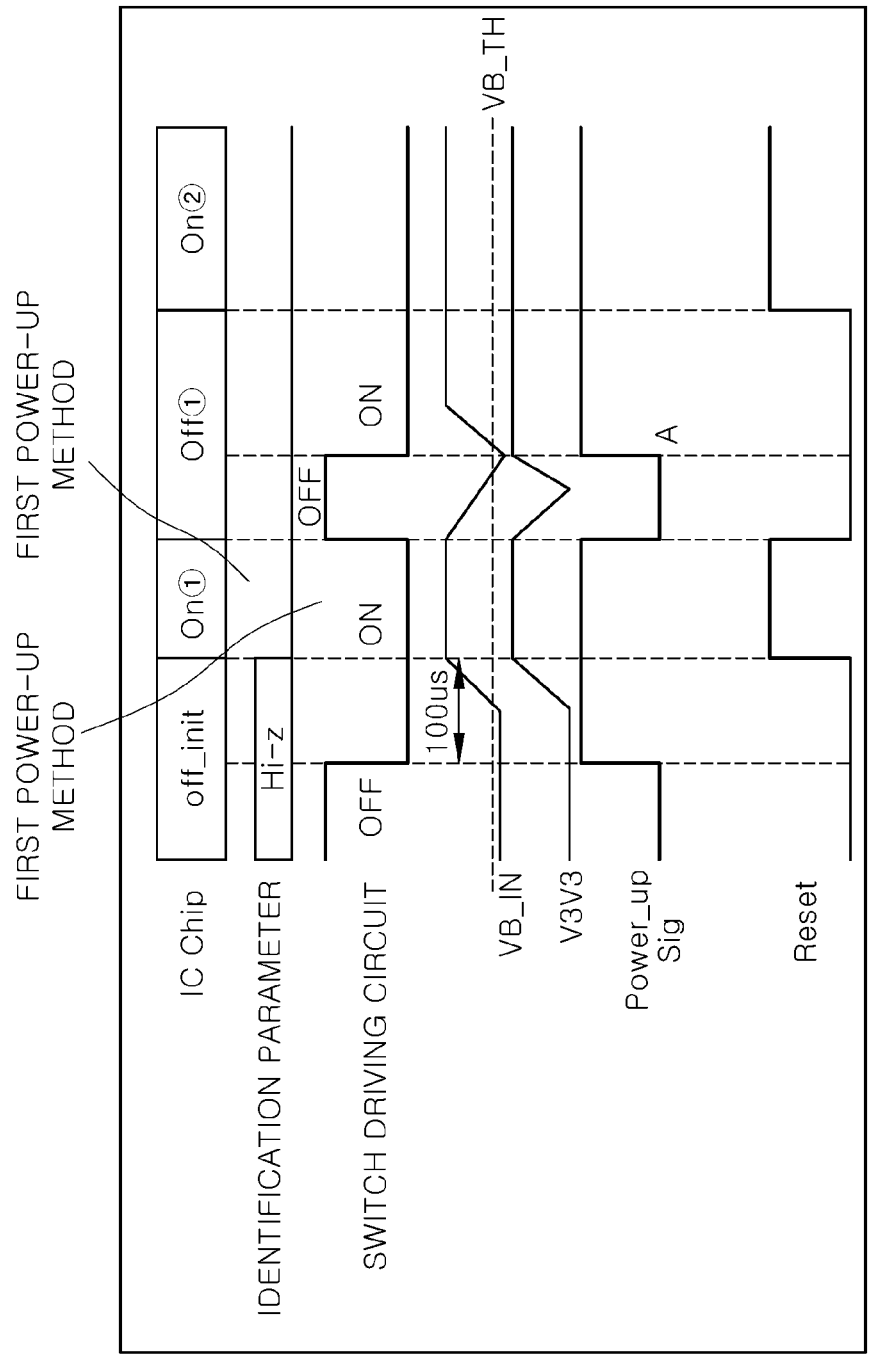
FIGS. 4A and 4B show an exemplary diagram for explaining a process in which power-up is normally performed through the power apparatus for a vehicle in accordance with the embodiment of the present disclosure.

A specific example thereof will be described with reference to FIG. 4. The primary power-up operation, the power-off operation, and the secondary power-up operation illustrated in FIG. 4 may correspond to operations that are continuously performed within a predefined time period FIG. 4(a) illustrates a case where, when a secondary power-up operation (On ②) is performed as the power-up signal Power_up sig is applied in a power-off state (Off ①) after a primary power-up operation (On ①), the switch driving circuit 20 is turned off during the power-off (Off ①) and thus the inductor is discharged, so that the input voltage of the node VB_IN decreases below a threshold VB_TH at a time point 'A' at which the power-up signal Power_up sig is applied. Such a case corresponds to a case where the power apparatus 1 normally determines that the power-up method is , the first power-up method. However, in the present embodiment, the power apparatus 1 operates to determine that the power-up method is the first power-up method, by referring to the first identification parameter stored in the register unit 40 during the secondary power-up operation (On ①), instead of the input voltage of the power input node.

Figure 4B:
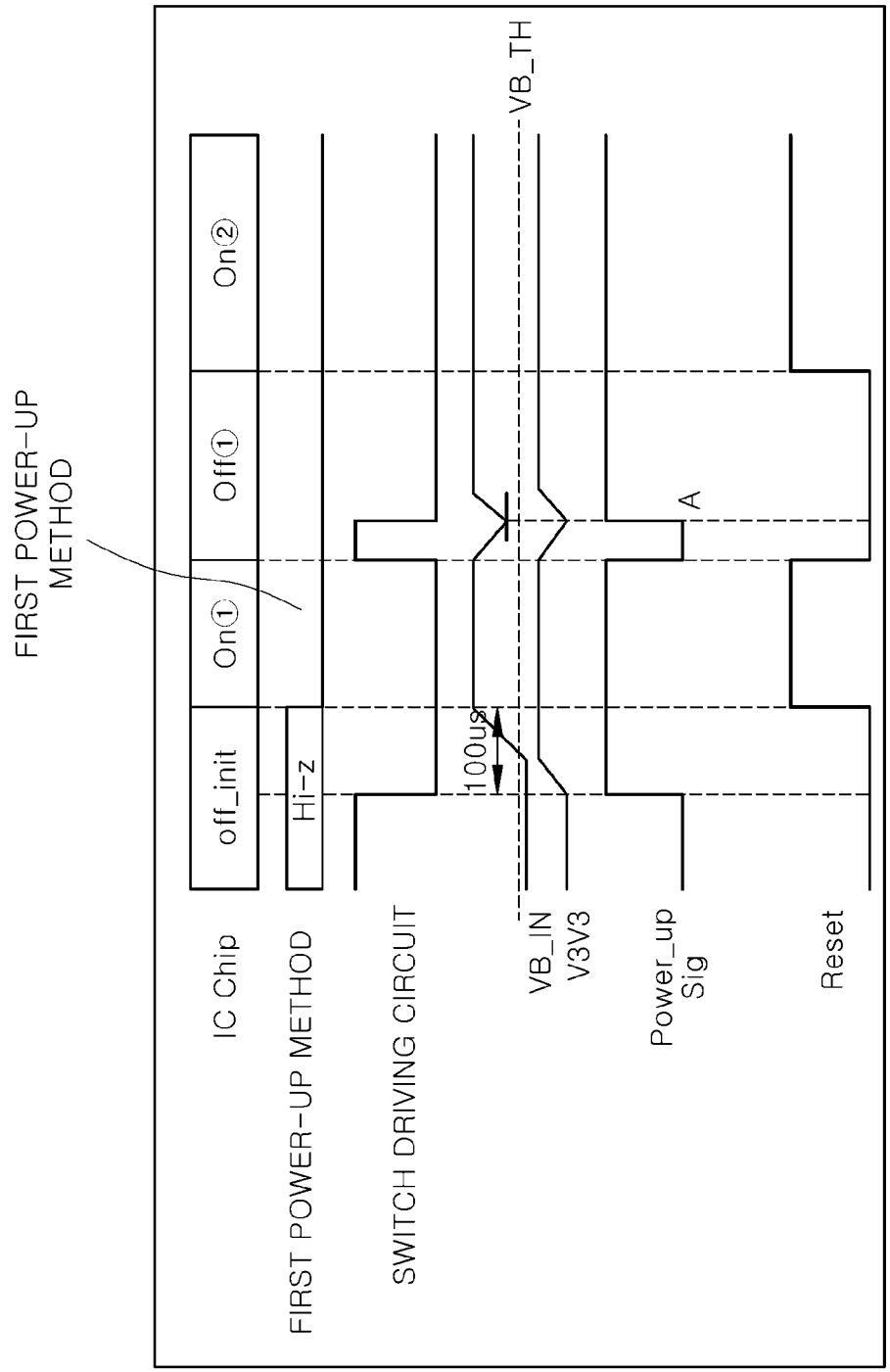

FIG. 4(b) illustrates a case where, when the secondary power-up operation (On ②) is performed as the power-up signal Power_up sig is applied in the power-off state (Off ①) after the primary power-up operation (On ①), the input voltage of the node VB_IN is equal to or greater than the threshold VB_TH at the time point 'A' at which the power-up signal Power_up sig is applied. In such a case, the power apparatus 1 operates to determine the power-up method on the basis of to the identification parameters stored in the register unit 40, not the input voltage. Thus, the power apparatus 1 may determine that the power-up method corresponds to the first power-up method, on the basis of the first identification parameter stored in the register unit 40, and transfer the control authority for the switch driving circuit 20 to the main logic circuit 30 so that the switch driving circuit 20 is turned on by the main logic circuit 30 and thus the switch SW is continuously turned on, thereby allowing the secondary power-up operation to be performed according to the first power-up method. Accordingly, even though the input voltage when the power-up signal Power_up sig is applied is equal to or greater than the threshold, power-up may be normally performed according to the first power-up method instead of the second power-up method.

In the above, the description has been focused on the configuration in which the power apparatus 1 is powered up according to the first power-up method (that is, the non-permanent battery method); however, the power apparatus 1 may be powered up according to the second power-up method (that is, the permanent battery method) depending on the specifications of a host system to which the power apparatus 1 is applied. Accordingly, the present embodiment may further include the mux circuit 50 configured to receive the identification parameters stored in the register unit 40 and to permit or limit the control authority of the main logic circuit 30 for the switch driving circuit 20.

Specifically, the mux circuit 50 may be configured to permit the control authority of the main logic circuit 30 for the switch driving circuit 20 when receiving the first identification parameter from the register unit 40, and to limit the control authority of the main logic circuit 30 for the switch driving circuit 20 when receiving the second identification parameter. That is, as illustrated in FIG. 3, when receiving the first identification parameter from the register unit 40, the mux circuit 50 may operate the regulator 10 and simultaneously permit the control authority of the main logic circuit 30 for the switch driving circuit 20, thereby allowing the power apparatus 1 to be powered up according to the first power-up method. When receiving the second identification parameter from the register unit 40, the mux circuit 50 may operate the regulator 10 and simultaneously limit the control authority of the main logic circuit 30 for the switch driving circuit 20, thereby allowing the power apparatus 1 to be powered up according to the second power-up method.

As described above, in the present embodiment, when a power-up signal is initially applied to an IC chip, a power-up method of the IC chip may be determined on the basis of a voltage of a node connected to a battery and may be stored in a register, and power-up may be performed according to information stored in the register during a subsequent power-up operation, which makes it possible to prevent erroneous determination on a power-up method currently applied the IC chip and allow power-up of the IC chip to be normally performed without a power-up failure.

Although the present disclosure has been described with reference to the embodiments illustrated in the drawings, the embodiments of the disclosure are for illustrative purposes only, and those skilled in the art will appreciate that various modifications and equivalent other embodiments are possible from the embodiments. Thus, the true technical scope of the present disclosure should be defined by the following claims.

What is claimed is:

1. A power apparatus for a vehicle, comprising:
   a regulator configured to regulate an input voltage from a battery inputted through a power input node connected to the battery of the vehicle;
   a switch driving circuit configured to turn on/off a switch that controls a connection between the battery and the regulator through the power input node, an operation of the switch driving circuit being controlled by the power apparatus when a power-up signal is initially applied;
   a register; and
   a main logic circuit configured to receive control authority for the switch driving circuit from the power apparatus when receiving the power-up signal and an operating voltage regulated by the regulator, and to control the switch driving circuit to control an on/off operation of the switch,
   wherein the power apparatus is configured to determine a power-up method on the basis of the input voltage from the battery when the power-up signal is initially applied, and to allow a subsequent power-up operation to be performed according to the determined power-up method,
   wherein, when the input voltage, at the time when the power-up signal is initially applied, is less than a predefined threshold, the power apparatus is configured to determine that a power-up method of the power apparatus is a first power-up method, and when the input voltage, at the time when the power-up signal is initially applied, is equal to or greater than the threshold, the power apparatus is configured to determine that the power-up method of the power apparatus is a second power-up method, and the first and second power-up methods are opposite methods with respect to whether the switch driving circuit is controlled,
   wherein, when determining that the power-up method is the first power-up method, the power apparatus is configured to turn on the switch by initially controlling the switch driving circuit,
   wherein the main logic circuit is configured to receive the operating voltage from the regulator, to receive the control authority for the switch driving circuit from the power apparatus, and to control the switch driving circuit so that an on state of the switch is substantially maintained, thereby allowing the power apparatus to be powered up according to the first power-up method,
   wherein when determining that the power-up method is the first power-up method as a case where the power-up signal is initially applied, the power apparatus is configured to store a first identification parameter indicating the first power-up method in the register, and to allow the subsequent power-up operation to be performed according to the first power-up method by referring to the first identification parameter stored in the register, during the subsequent power-up operation, and
   wherein, when a secondary power-up operation is performed as a power-up signal is applied in a power-off state after a primary power-up operation, and when the input voltage, at the time when the power-up signal is applied, is equal to or greater than the threshold, the power apparatus is configured to allow the secondary power-up operation to be performed according to the first power-up method by referring to the first identification parameter stored in the register.

2. The power apparatus according to claim 1, wherein the primary power-up operation, the power-off operation, and the secondary power-up operation of the power apparatus are continuously performed within a predefined time period.

3. A power apparatus for a vehicle, comprising:
a regulator configured to regulate an input voltage from a battery inputted through a power input node connected to the battery of the vehicle;
a switch driving circuit configured to turn on/off a switch that controls a connection between the battery and the regulator through the power input node, an operation of the switch driving circuit being controlled by the power apparatus when a power-up signal is initially applied;
a register;
a mux circuit; and
a main logic circuit configured to receive control authority for the switch driving circuit from the power apparatus when receiving the power-up signal and an operating voltage regulated by the regulator, and to control the switch driving circuit to control an on/off operation of the switch,
wherein the power apparatus is configured to determine a power-up method on the basis of the input voltage from the battery when the power-up signal is initially applied, and to allow a subsequent power-up operation to be performed according to the determined power-up method,
wherein, when the input voltage, at the time when the power-up signal is initially applied, is less than a predefined threshold, the power apparatus is configured to determine that a power-up method of the power apparatus is a first power-up method, and when the input voltage, at the time when the power-up signal is initially applied, is equal to or greater than the threshold, the power apparatus is configured to determine that the power-up method of the power apparatus is a second power-up method, and the first and second power-up methods are opposite methods with respect to whether the switch driving circuit is controlled,
wherein, when determining that the power-up method is the first power-up method, the power apparatus is configured to turn on the switch by initially controlling the switch driving circuit,
wherein the main logic circuit is configured to receive the operating voltage from the regulator, to receive the control authority for the switch driving circuit from the power apparatus, and to control the switch driving circuit so that an on state of the switch is substantially maintained, thereby allowing the power apparatus to be powered up according to the first power-up method,
wherein when determining that the power-up method is the first power-up method as a case where the power-up signal is initially applied, the power apparatus is configured to store a first identification parameter indicating the first power-up method in the register, and to allow the subsequent power-up operation to be performed according to the first power-up method by referring to the first identification parameter stored in the register, during the subsequent power-up operation,
wherein, when a secondary power-up operation is performed as a power-up signal is applied in a power-off state after a primary power-up operation, and when the input voltage, at the time when the power-up signal is applied, is equal to or greater than the threshold, the power apparatus is configured to allow the secondary power-up operation to be performed according to the first power-up method by referring to the first identification parameter stored in the register,
wherein when determining that the power-up method is the second power-up method as a case where the power-up signal is initially applied, the power apparatus is configured to store a second identification parameter indicating the second power-up method in the register, and
wherein the mux circuit is configured to receive the identification parameters stored in the register, to permit the control authority of the main logic circuit for the switch driving circuit when receiving the first identification parameter, and to limit the control authority of the main logic circuit for the switch driving circuit when receiving the second identification parameter.

4. The power apparatus according to claim 1, wherein when the switch driving circuit is turned on, an inductor of the switch is energized so that a switching contact point of the switch is shorted to connect the battery and the regulator through the power input node.

* * * * *